UNITED STATES PATENT OFFICE.

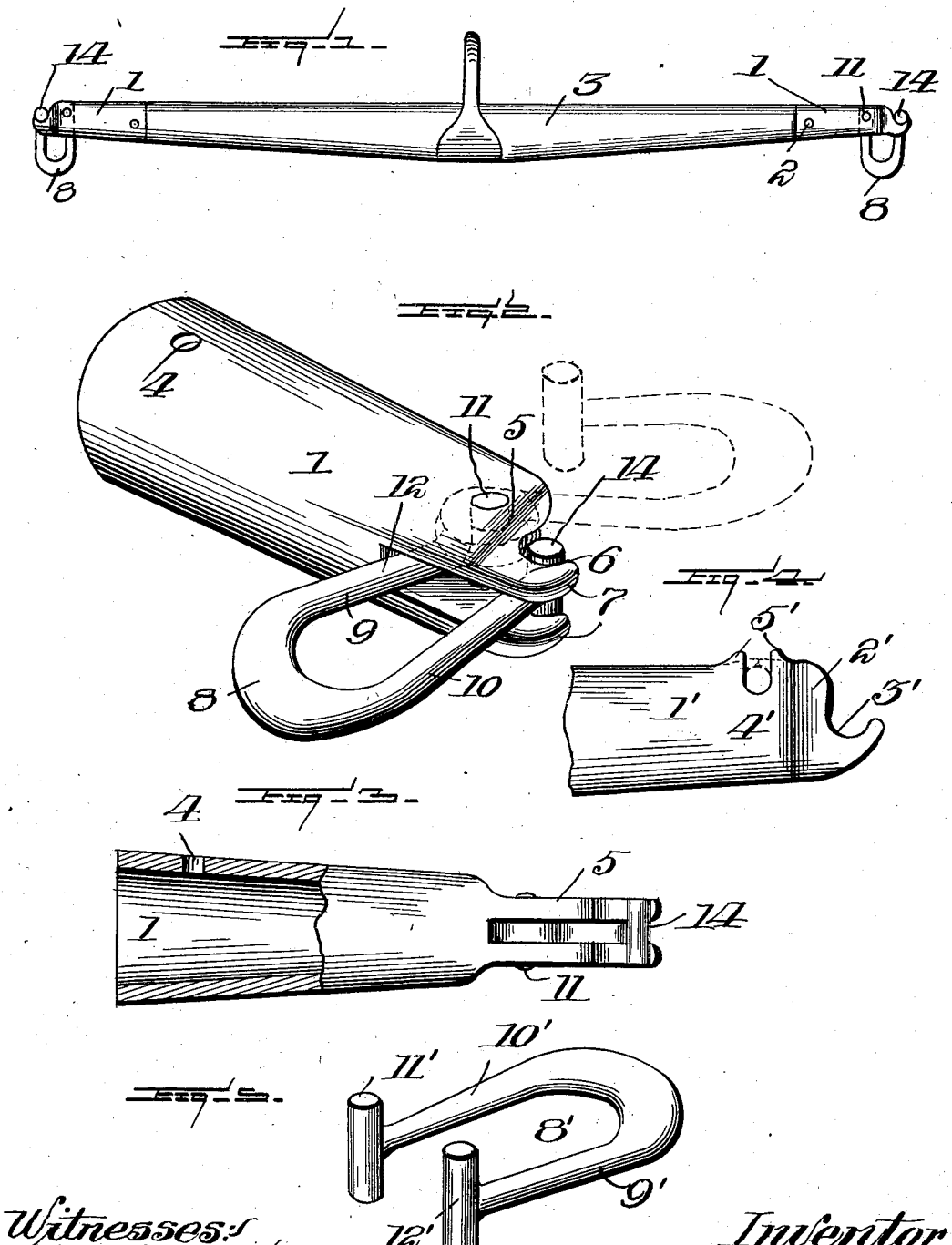

ARTHUR R. OTTERMAN, OF BRIDGEVILLE, PENNSYLVANIA, ASSIGNOR OF ONE-HALF TO OTTERMAN MANUFACTURING COMPANY, OF BRIDGEVILLE, PENNSYLVANIA, A CORPORATION OF PENNSYLVANIA.

WHIFFLETREE-HOOK.

SPECIFICATION forming part of Letters Patent No. 726,231, dated April 21, 1903.

Application filed September 16, 1902. Serial No. 123,577. (No model.)

*To all whom it may concern:*

Be it known that I, ARTHUR R. OTTERMAN, a citizen of the United States of America, residing at Bridgeville, in the county of Allegheny and State of Pennsylvania, have invented certain new and useful Improvements in Hooks, of which the following is a specification, reference being had therein to the accompanying drawings.

This invention relates to certain new and useful improvements in hooks such as are employed on whiffletrees, neck-yokes, and the like; and the main object of the invention is to construct a hook of this character which when in the closed position will lie in such manner as to prevent the accidental disengagement of the trace or other connection and which may also be readily moved out, so as to give clearance for the ready disengagement of the trace or connection.

Briefly described, my invention comprises, in connection with a ferrule or end tip for the whiffletree, neck-yoke, or the like, a substantially U-shaped hook, one arm of which is slightly longer than the other, which longer arm is pivoted in the ferrule or end tip, the other arm of the hook having a T-shaped head which engages with seats provided therefor on the ferrule or end tip. I may also construct the U-shaped hook with a T-shaped head on each end, pivoting one of the T-shaped heads in the ferrule or end tip instead of employing a pivot-pin separate from the hook.

The invention will be hereinafter more specifically described, and then particularly pointed out in the claims, and in describing the same in detail reference will be had to the accompanying drawings, forming a part of this invention, and wherein like numerals of reference will be employed to designate like parts throughout the several views, in which—

Figure 1 is a side elevation of a singletree equipped with my improved hooks. Fig. 2 is a detail perspective view of the ferrule or end tip and the hook, showing the latter in full lines in the closed position and in dotted lines when in the open position. Fig. 3 is a top plan view of the ferrule or end tip and hook, the ferrule or end tip being partly broken away and in section. Fig. 4 is a side elevation of a portion of the ferrule or end tip, showing a modified form of construction; and Fig. 5 is a detail perspective view of the modified form of hook adapted to be employed in connection with the construction of ferrule or end tip shown in Fig. 4.

In the accompanying illustration I have shown my invention as applied to a whiffletree; but it is by no means limited to this use and may as well be advantageously used on neck-yokes or in other places where hooks of this type are employed.

To put my invention into practice, I construct the ferrule or tip end, which fits on the ends of the whiffletree or the like, hollow, so that the said ferrule 1 may receive the end of the whiffletree or like object. It is securely fastened by a screw, rivet, nail, or the like, as at 2, inserted into the whiffletree 3 through an aperture 4, provided in the ferrule for that purpose. At its outer end the ferrule or sleeve is bifurcated to form two cheeks or side pieces 5, the metal of which the ferrule is formed being drawn in at the end, so that these two cheeks or side pieces lie in a plane inside the two sides of the ferrule. These cheek or side pieces are cut away on their upper edge and formed with concave seats 6, substantially producing hook ends 7 on the ferrule. Pivoted between the two cheeks or side pieces 5, near the rear end thereof, is a substantially U-shaped hook 8, the arm 9 of which is of greater length than the arm 10. This arm 9 in the construction shown in Figs. 1, 2, and 3 is provided with an eye to receive the pivot-pin 11, which pivots the same between the jaws or side pieces 5 at a point above the central horizontal line through the whiffletree and ferrule. When in the closed position, the portion of the arm 9 of the hook that lies between the jaws or side pieces engages the wall 12, and the arm is thereby given a bearing-surface of considerable length, and this engagement of the arm with the wall 12 also serves to relieve the pulling strain from the free end of the arm 10. The free end of the arm 10 is formed with a T-shaped head 14, so as to engage in the concave seats 6, and it will be observed by reference to Fig. 1 that when the head of the hook is in engagement with the seats 6 the ends of the hook ends or lugs 7 are about flush with the periphery of the head 14, so as not to catch upon any object with which the end of the whiffletree may come in engagement. The hook is pivoted above the central horizontal line of the whiffletree for the reason that the pulling strain is against the closed end of the hook, and the pivot-point being beyond the central line of the ferrule more material is provided for the pulling strain. It is further pivoted off the central line, so as to afford a greater clearance between the head 14 and the ferrule when the hook is opened than would be obtained were the pivot in the central line of the ferrule.

In Fig. 4 I show a slightly-modified form of ferrule, and in Fig. 5 the form of hook to accompany this form of ferrule. The ferrule 1' in this construction is provided with the jaws or cheek-pieces 2', having concave seats 3' for the headed end of the hook. In the upper edge of the jaws or cheek-pieces I provide bearing-seats 4' and strike up the material at each side thereof to form small lugs 5'. The hook 8' to accompany this form of ferrule has the arm 9', of greater length than the arm 10', the former having a T-shaped head 11' and the latter a T-shaped head 12'. The head 11' is placed in the journal-seats 4', and the lugs 5' are bent over, as shown in dotted lines, to retain the hook pivoted in position.

With either form it will be observed that the principle of operation is the same, the hook swinging freely on its pivot 11 or 11', as the case may be. When swung outward, as shown in dotted lines in Fig. 2, the trace or other device may be easily connected with or disengaged from the hook, and when closed is prevented from accidental disengagement by the T-shaped head engaging the seats provided therefor.

While I have shown and described a practical embodiment of my invention as practiced by me, yet it will be observed that slight changes may be made in the details of construction without departing from the general spirit of my invention.

Having fully described my invention, what I claim as new, and desire to secure by Letters Patent, is—

1. In a device of the character described, the combination with a ferrule having its end bifurcated, thereby forming parallel cheeks, the outer ends of which are provided with seats, of a substantially U-shaped hook having one arm longer than the other, the longer of said arms being pivoted in the bifurcated end of the ferrule, and a head on the free end of the shorter arm of the hook to engage the seats in the ferrule when the hook is closed, substantially as described.

2. In a combination with a ferrule bifurcated at its end to form cheek-pieces, said cheek-pieces being formed with seats, of a substantially U-shaped hook having its one end pivoted in said cheek-pieces and having a head or enlargement on its other end for engagement with the seats of the said cheek-pieces when the hook is closed, substantially as described.

3. The combination with a ferrule bifurcated at its end to form cheek-pieces, said cheek-pieces being formed with seats at their outer ends, of a hook pivoted between the said cheek-plates and adapted to have its free end received in the seats of the said cheek-pieces when the hook is closed.

4. The combination with the ferrule, having a bifurcated end, of a hook having its inner end pivoted in the bifurcated end of the said ferrule, and means for engagement with the outer end of the said hook, substantially as and for the purpose specified.

5. The combination with the ferrule, of a pair of cheek-pieces carried by the said ferrule, said cheek-pieces having their outer ends formed with hooks, a hook pivoted between the said cheek-pieces and having its free end engaged by the hooked ends of the said cheek-pieces when the hook is closed, substantially as described.

6. The combination with the ferrule, of cheek-pieces carried by the said ferrule, said cheek-pieces being formed with seats, and a hook pivoted between the said cheek-pieces at a point in the rear of the seats thereof, said hook having its free end enlarged and adapted to be received in the seat of the said cheek-pieces when the hook is closed.

In testimony whereof I affix my signature in the presence of two witnesses.

ARTHUR R. OTTERMAN.

Witnesses:
A. M. WILSON,
K. H. BUTLER.